United States Patent
Lai et al.

(10) Patent No.: US 12,378,343 B2
(45) Date of Patent: Aug. 5, 2025

(54) SILICONE HYDROGEL COMPOSITION AND SILICONE HYDROGEL LENS

(71) Applicant: PEGAVISION CORPORATION, Taoyuan (TW)

(72) Inventors: Yu-Chin Lai, Taoyuan (TW); Ting-Chun Kuan, Taoyuan (TW); Di-Yao Hsu, Taoyuan (TW); Fang-Yu Tsai, Taoyuan (TW); Min-Tzung Yeh, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 57 days.

(21) Appl. No.: 18/358,927

(22) Filed: Jul. 25, 2023

(65) Prior Publication Data

US 2023/0382066 A1 Nov. 30, 2023

Related U.S. Application Data

(63) Continuation of application No. 16/455,727, filed on Jun. 27, 2019, now Pat. No. 11,760,045.

(30) Foreign Application Priority Data

Nov. 30, 2018 (TW) .................... 107143129

(51) Int. Cl.
*C08F 230/08* (2006.01)
*B29D 11/00* (2006.01)
(Continued)

(52) U.S. Cl.
CPC ...... *C08F 230/08* (2013.01); *B29D 11/00134* (2013.01); *G02B 1/043* (2013.01); *B29K 2083/005* (2013.01); *B29K 2105/0061* (2013.01)

(58) Field of Classification Search
CPC ... B29D 11/00134; C08F 230/08; F02B 1/043
See application file for complete search history.

(56) References Cited

U.S. PATENT DOCUMENTS

| | | |
|---|---|---|
| 2013/0162942 A1 | 6/2013 | Norris et al. |
| 2014/0024738 A1 | 1/2014 | Chen et al. |
| 2018/0100039 A1 | 4/2018 | Zhang et al. |

FOREIGN PATENT DOCUMENTS

| | | |
|---|---|---|
| CN | 1635915 A | 7/2005 |
| CN | 103415802 A | 11/2013 |

(Continued)

*Primary Examiner* — Mathieu D Vargot
(74) *Attorney, Agent, or Firm* — CKC & Partners Co., LLC

(57) ABSTRACT

A silicone hydrogel composition includes a first hydrophilic monomer, a siloxane compound, a first crosslinking monomer, a second hydrophilic monomer, and a second crosslinking monomer. The first hydrophilic monomer and the siloxane compound have an acrylate group or an acrylamide group and may also have a methacrylate group or a methacrylamide group. The first crosslinking monomer has a plurality of acrylate groups or acrylamide groups and may also have methacrylate groups or methacrylamide groups. The second hydrophilic monomer has a non-conjugated vinyl group. The second crosslinking monomer has a plurality of non-conjugated vinyl groups. A sum of the weights of the second hydrophilic monomer and the second crosslinking monomer is 40 to 100 parts by weight, relative to 100 parts by weight of the sum of the weights of the first hydrophilic monomer, the siloxane compound, and the first crosslinking monomer.

19 Claims, 1 Drawing Sheet

(51) Int. Cl.
*G02B 1/04* (2006.01)
*B29K 83/00* (2006.01)
*B29K 105/00* (2006.01)

(56) References Cited

FOREIGN PATENT DOCUMENTS

| | | |
|---|---|---|
| CN | 112352170 A | 2/2021 |
| JP | 2008-535962 A | 9/2008 |
| JP | 2012-513042 A | 6/2012 |
| JP | 2013-139569 A | 7/2013 |
| JP | 2015206011 A | 11/2015 |
| JP | 2015-230342 A | 12/2015 |

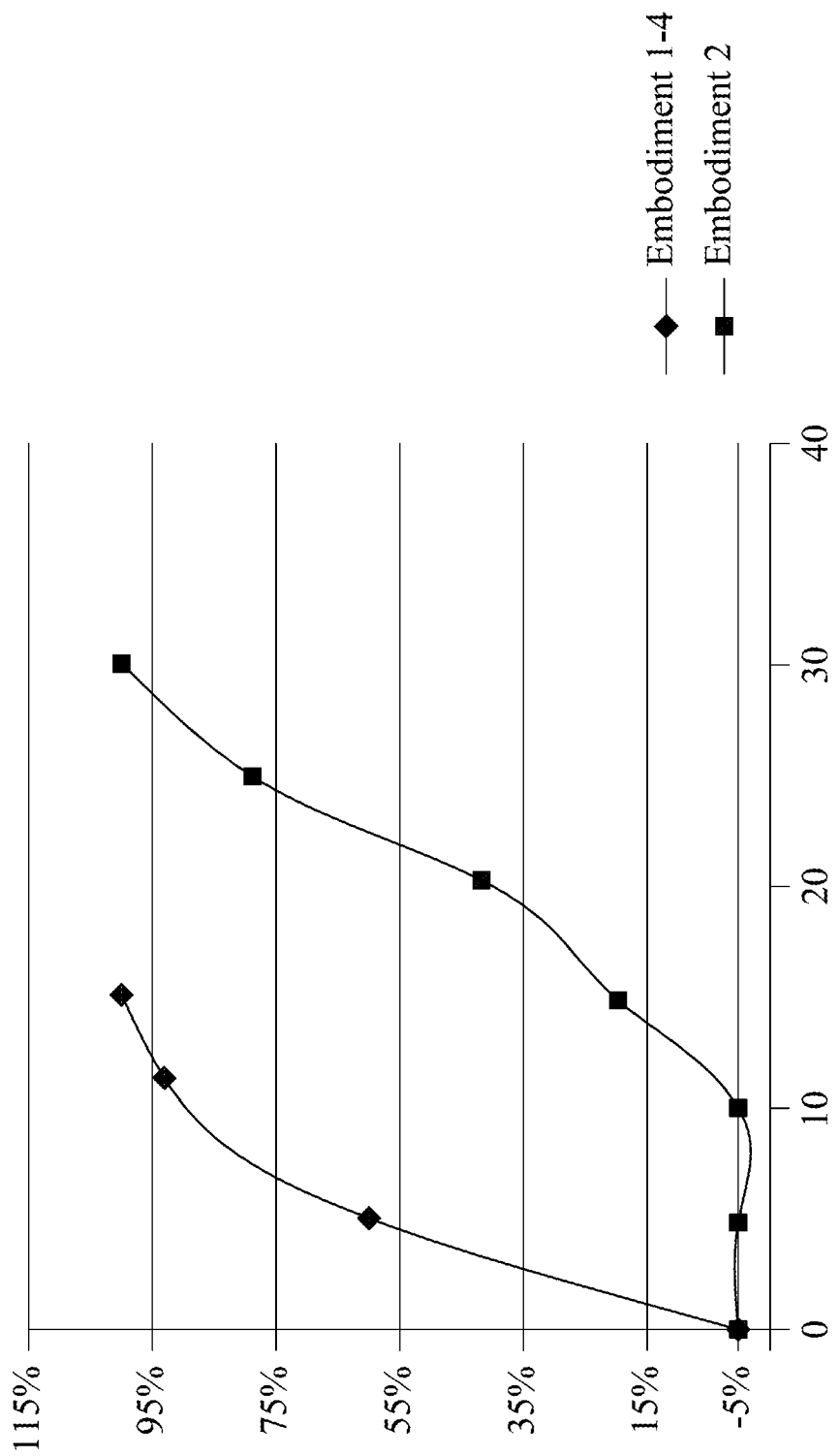

SILICONE HYDROGEL COMPOSITION AND SILICONE HYDROGEL LENS

CROSS-REFERENCE TO RELATED APPLICATION

This application is a Continuation of U.S. application Ser. No. 16/455,727, filed on Jun. 27, 2019, now U.S. Pat. No. 11,760,045, which claims priority to Taiwan Application Serial Number 107143129, filed Nov. 30, 2018, which is herein incorporated by reference.

BACKGROUND

Field of Invention

The present disclosure relates to a silicone hydrogel composition, a silicone hydrogel lens made from the silicone hydrogel composition, and a method of manufacturing the silicone hydrogel lens.

Description of Related Art

With the increasing popularity of contact lenses, wearing comfort of a contact lenses has been increasingly valued by wearers. Silicone hydrogel contact lenses have high oxygen permeability since they include a siloxane compound. Sufficient oxygen can pass directly through the lens and contact cornea to provide sufficient oxygen—to the cornea. Accordingly, even if a silicone hydrogel contact lens is worn for a long time, it is less likely to cause symptoms of eye discomfort due to corneal hypoxia.

However, the manufacturing cost of a silicone hydrogel contact lens is much more expensive than that of a contact lens excluding a siloxane compound. It is because in the manufacture of a silicone hydrogel contact lens, the lens should be washed using an organic solvent such as isopropanol, ethanol or methyl ethyl ketone to remove unreacted siloxane compound. Therefore, how to reduce the manufacturing cost of a silicone hydrogel contact lens is still an urgent problem to be solved.

SUMMARY

An aspect of the present disclosure provides a silicone hydrogel composition including a first hydrophilic monomer, a siloxane compound, a first crosslinking monomer, a second hydrophilic monomer, and a second crosslinking monomer. Each of the first hydrophilic monomer and the siloxane compound has an acrylate group or an acrylamide group and may also have a minor amount of a methacrylate group or a methacrylamide group. The first crosslinking monomer has a plurality of acrylate groups or acrylamide groups and may also have methacrylate groups or methacrylamide groups. The second hydrophilic monomer has a non-conjugated vinyl group. The second crosslinking monomer has a plurality of non-conjugated vinyl groups. A sum of the weight of the second hydrophilic monomer and the weight of the second crosslinking monomer is 40 to 100 parts by weight, relative to 100 parts by weight of a sum of the weight of the first hydrophilic monomer, the weight of the siloxane compound, and the weight of the first crosslinking monomer.

In one embodiment of the present disclosure, energy required for the polymerization of the second hydrophilic monomer and the second crosslinking monomer is higher than that of the first hydrophilic monomer, the siloxane compound, and the first crosslinking monomer.

In one embodiment of the present disclosure, the siloxane compound is in a range of 35 wt % to 60 wt % based on the total weight of the silicone hydrogel composition.

In one embodiment of the present disclosure, the siloxane compound has a structure of the following formula (1):

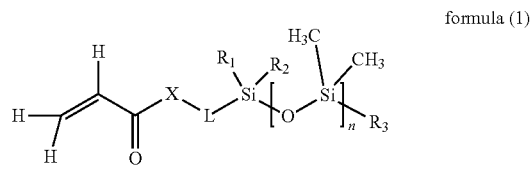

formula (1)

in which X is O or NH;
L is $(CH_2)_m$, $(CH_2)_m—[O(CH_2)_p]_q$ or $(CH_2)_m(CHOH)—[O(CH_2)_p]_q$;
$R_1$ is OH, $CH_3$ or $OSi(CH_3)_3$;
$R_2$ is $CH_3$ or $OSi(CH_3)_3$;
$R_3$ is an alkyl group;
n is an integer from 1 to 30;
m and p are integers from 2 to 5; and
q is an integer from 1 to 5.

In one embodiment of the present disclosure, the siloxane compound is a siloxane monomer, a siloxane macromonomer or a siloxane prepolymer.

In one embodiment of the present disclosure, the siloxane compound has a number average molecular weight of less than 1200.

In one embodiment of the present disclosure, the siloxane compound is selected from the group comprising 3-tris(trimethyl siloxy) silylpropyl acrylamide, 3-tris(trimethyl siloxy) silylpropyl acrylate, 3-tris(triethyl siloxy) silylpropyl acrylamide, 3-tris(triethyl siloxy) silylpropyl acrylate, (3-acryloxy-2-hydroxy propoxy) propyl bis(trimethyl siloxy) methyl silane, (3-acryloxy-2-hydroxy propoxy) propyl bis(trimethyl siloxy) ethyl silane, (3-acrylamido-2-hydroxy propoxy) propyl bis(trimethyl siloxy)methyl silane, (3-acrylamido-2-hydroxy propoxy) propyl bis(trimethyl siloxy)ethyl silane, α-acrylamidopropyl-ω-butyl polydimethylsiloxane, α-acrylamidoethoxypropyl-ω-butyl polydimethylsiloxane, α-acryloxybutyl-ω-butyl polydimethylsiloxane, α-acryloxypropyl-ω-butyl polydimethylsiloxane, α-acryloxyethoxypropyl-ω-butyl polydimethylsiloxane, bis-α,ω-acrylamidopropyl polydimethylsiloxane, bis-α,ω-acrylamidoethoxypropyl polydimethylsiloxane, bis-α,ω-acryloxybutyl polydimethylsiloxane, bis-α, ω-acryloxypropyl polydimethylsiloxane, bis-α,ω-acryloxyethoxypropyl polydimethylsiloxane, or a combination thereof.

In one embodiment of the present disclosure, the first hydrophilic monomer is in a range of 10 wt % to 40 wt % based on the total weight of the silicone hydrogel composition.

In one embodiment of the present disclosure, the first hydrophilic monomer is selected from the group comprising 2-hydroxyethyl acrylamide, glycerol acrylate, acrylic acid, N,N-dimethylacrylamide, hydroxyethyl acrylamide, 2-acrylamido-2-methylpropanesulfonic acid, or a combination thereof.

In one embodiment of the present disclosure, the first crosslinking monomer is in a range of 0.1 wt % to 5 wt % based on the total weight of the silicone hydrogel composition.

In one embodiment of the present disclosure, the first crosslinking monomer is selected from the group comprising trimethylpropyl trimethacrylate, ethylene glycol diacrylate, diethylene glycol diacrylate, triethylene glycol diacrylate, trimethylolpropane triacrylate, pentaerythritol tetra acrylate, tetraethylene glycol diacrylate, ethylene diacrylamide, butylene 1,4-diacrylamide, or a combination of thereof.

In one embodiment of the present disclosure, the second hydrophilic monomer is in a range of 20 wt % to 50 wt % based on the total weight of the silicone hydrogel composition.

In one embodiment of the present disclosure, the second hydrophilic monomer is selected from the group comprising N-vinyl pyrrolidone, 1-vinylazonan-2-one, N-vinyl-N-methyl acetamide, vinyl sulfonic acid, glycine vinyl carbamate, glycine vinyl carbonate, or a combination thereof.

In one embodiment of the present disclosure, the second crosslinking monomer is in a range of 0.01 wt % to 1 wt % based on the total weight of the silicone hydrogel composition.

In one embodiment of the present disclosure, the second crosslinking monomer is 1,3,5-triallyl isocyanurate.

In one embodiment of the present disclosure, the first hydrophilic monomer, the siloxane compound, and the first crosslinking monomer include acrylate groups or acrylamide groups. Those may also include a minor amount of methacrylate groups or methacrylamide groups. When those include methacrylate groups or methacrylamide groups, those are in a range of less than or equal to 20 wt % based on the total weight of the silicone hydrogel composition.

In an embodiment of the present disclosure, the silicone hydrogel composition further includes a photoinitiator.

In one embodiment of the present disclosure, the photoinitiator is selected from the group comprising 1-hydroxycyclohexyl phenyl ketone, 2-benzyl-2-dimethylamino-1-(4-morpholinophenyl)-butanone-1,2,2-dimethoxy-1,2-diphenylethan-1-one, bis (η5,2,4-cyclo penta dien-1-yl)-bis (2,6-difluoro-3-(1H-pyrol-1-yl)-phenyl)titanium, 2,4,6-trimethyl benzoyl diphenyl phosphine oxide, phenyl bis(2,4,6-trimethyl benzoyl)phosphine oxide, bis-(2,6-dimethoxy benzoyl) (2,4,4-trimethylpentyl) phosphine oxide or a combination thereof.

Another aspect of the present disclosure provides a silicone hydrogel lens made from a silicone hydrogel composition described above using a photocuring reaction.

In one embodiment of the present disclosure, the silicone hydrogel lens is free of extraction using an organic solvent after the photocuring reaction.

Another aspect of the present disclosure provides a method of manufacturing a silicone hydrogel lens including: (i) providing a silicone hydrogel composition as described above; and (ii) sequentially performing a first photocuring reaction and a second photocuring reaction on the silicone hydrogel composition to form the silicone hydrogel lens, in which energy applied in the second photocuring reaction is higher than energy applied in the first photocuring reaction.

In an embodiment of the present disclosure, the energy applied in the first photocuring reaction is less than 50 mJ/cm$^2$, and the energy applied in the second photocuring reaction is higher than 100 mJ/cm$^2$.

In an embodiment of the present disclosure, after performing the first photocuring reaction and the second photocuring reaction, the method further includes: (iii) extracting the silicone hydrogel lens using an aqueous solution.

The above description will be described in detail in the following embodiments, and further explanation of the technical solutions of the present disclosure will be provided.

BRIEF DESCRIPTION OF THE DRAWINGS

FIG. 1 is a graph showing the relationship between the curing ratio and the time of the silicone hydrogel compositions according to some embodiments of the present disclosure.

DETAILED DESCRIPTION

In order that the present disclosure is described in detail and completeness, implementation aspects and specific embodiments of the present disclosure with illustrative description are presented; but it is not the only form for implementation or use of the specific embodiments. The embodiments disclosed herein may be combined or substituted with each other in an advantageous manner, and other embodiments may be added to an embodiment without further description. In the following description, numerous specific details will be described in detail in order to enable the reader to fully understand the following embodiments. However, the embodiments of the present disclosure may be practiced without these specific details.

Silicone Hydrogel Composition

The silicone hydrogel composition of the present disclosure can be used to prepare a silicone hydrogel contact lens (hereinafter referred to as a contact lens). According to various embodiments, the silicone hydrogel composition includes a first hydrophilic monomer, a siloxane compound, a first crosslinking monomer, a second hydrophilic monomer, and a second crosslinking monomer. Preferably, in one embodiment, a sum of the weight of the second hydrophilic monomer and the weight of the second crosslinking monomer is 40 to 100 parts by weight, relative to 100 parts by weight of a sum of the weight of the first hydrophilic monomer, the weight of the siloxane compound, and the weight of the first crosslinking monomer. For example, a sum of the first hydrophilic monomer, the siloxane compound, and the first crosslinking monomer is in a range of 50 wt % to 80 wt % based on the total weight of the silicone hydrogel composition, and a sum of the second hydrophilic monomer and the second crosslinking monomer is in a range of 20 wt % to 50 wt % based on the total weight of the silicone hydrogel composition.

First Hydrophilic Monomer

According to various embodiments, the first hydrophilic monomer has an acrylate group

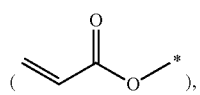

a methacrylate group

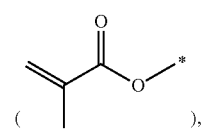

an acrylamide group

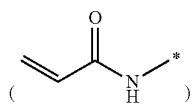

or a methacrylamide group

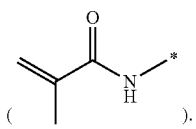

Preferably, in one embodiment, the first hydrophilic monomer is in a range of 15 wt % to 30 wt % based on the total weight of the silicone hydrogel composition. In some embodiments, the first hydrophilic monomer is selected from the group comprising 2-hydroxyethyl methacrylate (HEMA), 2-hydroxyethyl acrylamide (HEAA), glycerol acrylate, acrylic acid, N,N-dimethylacrylamide (DMA), hydroxyethyl acrylamide, 2-acrylamido-2-methylpropanesulfonic acid, or a combination thereof.

Siloxane Compound

According to various embodiments, the siloxane compound has an acrylate group, a methacrylate group, an acrylamide group, or a methacrylamide group. In one embodiment, the siloxane compound refers to a compound having a plurality of repeating dimethylsiloxane groups, and the compound further has at least one acrylate group, methacrylate group, acrylamide group or methacrylamide group. In one embodiment, the siloxane compound is a compound having at least two repeating dimethylsiloxane groups, and the compound further has at least two acrylate groups, methacrylate groups, acrylamide groups or methacrylamide groups.

In one embodiment, the siloxane compound has a structure of the following formula (1):

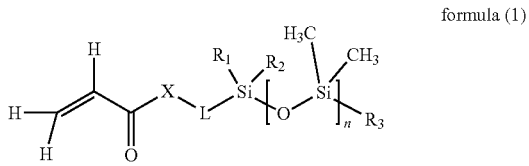

formula (1)

in which X is O or NH; L is $(CH_2)_m$, $(CH_2)_m—[O(CH_2)_p]_q$ or $(CH_2)_m(CHOH)—[O(CH_2)_p]_q$; $R_1$ is OH, $CH_3$ or $OSi(CH_3)_3$; $R_2$ is $CH_3$ or $OSi(CH_3)_3$; $R_3$ is an alkyl group; n is an integer from 1 to 30; m and p are integers from 2 to 5; and q is an integer from 1 to 5.

In one embodiment, the siloxane compound is a siloxane monomer, a siloxane macromonomer or a siloxane prepolymer. Preferably, in one embodiment, the siloxane compound is in a range of 35 wt % to 60 wt % based on the total weight of the silicone hydrogel composition. In some embodiments, the siloxane compound is selected from the group comprising 3-tris(trimethyl siloxy) silylpropyl acrylamide (TRISAm), 3-tris(trimethyl siloxy) silylpropyl acrylate (TRISA), 3-tris(triethyl siloxy) silylpropyl acrylamide, 3-tris(triethyl siloxy) silylpropyl acrylate, (3-acryloxy-2-hydroxy propoxy) propyl bis(trimethyl siloxy) methyl silane, (3-acryloxy-2-hydroxy propoxy) propyl bis(trimethyl siloxy) ethyl silane, (3-acrylamido-2-hydroxy propoxy) propyl bis(trimethyl siloxy)methyl silane, (3-acrylamido-2-hydroxy propoxy) propyl bis(trimethyl siloxy)ethyl silane, α-acrylamidopropyl-ω-butyl polydimethylsiloxane, α-acrylamidoethoxypropyl-ω-butyl polydimethylsiloxane, α-acryloxybutyl-ω-butyl polydimethylsiloxane, α-acryloxypropyl-ω-butyl polydimethylsiloxane, α-acryloxyethoxypropyl-ω-butyl polydimethylsiloxane, bis-α,ω-acrylamidopropyl polydimethylsiloxane, bis-α,ω-acrylamidoethoxypropyl polydimethylsiloxane, bis-α,ω-acryloxybutyl polydimethylsiloxane, bis-α,ω-acryloxypropyl polydimethylsiloxane, bis-α,ω-acryloxyethoxypropyl polydimethylsiloxane, or a combination thereof. In some embodiments, the siloxane compound has a number average molecular weight (Mn) of less than 1200, such as in a range of 200 to 1200. Preferably, in one embodiment, the siloxane compound has a number average molecular weight of less than 1000, such as less than 800.

First Crosslinking Monomer

According to various embodiments, the first crosslinking monomer has a plurality of acrylate groups, methacrylate groups, acrylamide groups, or methacrylamide groups. Preferably, in one embodiment, the first crosslinking monomer is in a range of 0.1 wt % to 5 wt % based on the total weight of the silicone hydrogel composition. In some embodiments, the first crosslinking monomer is selected from the group comprising trimethylpropyl trimethacrylate (TMPTMA), ethylene glycol diacrylate, diethylene glycol diacrylate, triethylene glycol diacrylate, trimethylolpropane triacrylate, pentaerythritol tetra acrylate, tetraethylene glycol diacrylate, ethylene diacrylamide, butylene 1,4-diacrylamide, or a combination of thereof.

It should be understood that each of the first hydrophilic monomer, the siloxane compound, and the first crosslinking monomer includes an acrylate group or an acrylamide group and may also include a minor amount of a methacrylate group or a methacrylamide group to provide specific technical effects, as described in more detail below.

Second Hydrophilic Monomer

According to various embodiments, the second hydrophilic monomer has a non-conjugated vinyl group. Preferably, in one embodiment, the second hydrophilic monomer is in a range of 20 wt % to 50 wt % based on the total weight of the silicone hydrogel composition. In some embodiments, the second hydrophilic monomer is selected from the group comprising N-vinyl pyrrolidone, 1-vinylazonan-2-one, N-vinyl-N-methyl acetamide, vinyl sulfonic acid, glycine vinyl carbamate, glycine vinyl carbonate, or a combination thereof.

Second Crosslinking Monomer

According to various embodiments, the second crosslinking monomer has a plurality of non-conjugated vinyl groups. Preferably, in one embodiment, the second crosslinking monomer is in a range of 0.01 wt % to 1 wt % based on the total weight of the silicone hydrogel composition. In some embodiments, the second crosslinking monomer is 1,3,5-triallyl isocyanurate (TAIC).

As described above, each of the first hydrophilic monomer, the siloxane compound, and the first crosslinking monomer includes an acrylate group or an acrylamide group and may also include a minor amount of a methacrylate group or a methacrylamide group to provide specific technical effects. Specifically, compared to a compound having a non-conjugated vinyl group (e.g., the second hydrophilic monomer and the second crosslinking monomer), a compound having an acrylate group, an acrylamide group, a methacrylate group or a methacrylamide group has lower energy required for polymerization. Therefore, when the silicone hydrogel composition of the present disclosure is cured, low energy may be firstly applied to polymerize the first hydrophilic monomer, the siloxane compound, and the first crosslinking monomer. After those are completely polymerized, high energy is applied to polymerize the second hydrophilic monomer and the second crosslinking monomer.

According to this, when a low energy is applied, the second hydrophilic monomer and the second crosslinking monomer have not started to polymerize, and the first hydrophilic monomer, the siloxane compound, and the first crosslinking monomer have already been completely polymerized to form a network. Next, when a high energy is applied, the second hydrophilic monomer and the second crosslinking monomer are polymerized on the formed network to form an interpenetrating polymer network (IPN). Since almost all of the siloxane compound has been completely polymerized without residue after the end of the curing reaction, it is not necessary to use an organic solvent to wash the lens obtained by polymerization, thereby reducing the manufacturing cost of the contact lens.

However, it should be noted that the first hydrophilic monomer, the siloxane compound, and the first crosslinking monomer may include a methacrylate group, but steric hindrance of the methacrylate group enhances the energy required for the polymerization of these compounds. Therefore, preferably, in the silicone hydrogel composition, the first hydrophilic monomer, the siloxane compound, and the first crosslinking monomer having the methacrylate group are not too many, so that these compounds can be polymerized when low energy is applied. For example, the first hydrophilic monomer, the siloxane compound, and the first crosslinking monomer including the methacrylate group are less than or equal to 20 wt % based on the total weight of the silicone hydrogel composition, such as 18 wt %, 15 wt %, 10% or 5 wt %.

Photoinitiator

According to various embodiments, the silicone hydrogel composition further includes a photoinitiator. In some embodiments, the photoinitiator is selected from the group comprising 1-hydroxycyclohexyl phenyl ketone (hereinafter referred to as I-184), 2-benzyl-2-dimethylamino-1-(4-morpholinophenyl)-butanone-1,2,2-dimethoxy-1,2-diphenyle-than-1-one, bis (η5,2,4-cyclo penta dien-1-yl)-bis(2,6-difluoro-3-(1H-pyrol-1-yl)-phenyl)titanium), 2,4,6-trimethyl benzoyl diphenyl phosphine oxide (hereinafter referred to as TPO), phenyl bis(2,4,6-trimethyl benzoyl)phosphine oxide (hereinafter referred to as I-819), bis-(2,6-dimethoxy benzoyl) (2,4,4-trimethylpentyl) phosphine oxide (hereinafter referred to as I-403), or a combination thereof, such as Irgacure-1800 (hereinafter referred to as I-1800, which is a combination of I-403 and I-184) or Irgacure 1700 (hereinafter referred to as I-1700, which is a combination of I-403 and Darocur 1173 (hereinafter referred to as D-1173)). D-1173 is 2-hydroxy-2-methyl propiophenone.

Manufacture of Silicone Hydrogel Lens

According to various embodiments, a method of manufacturing a silicone hydrogel lens includes sequentially performing a first photocuring reaction and a second photocuring reaction on the silicone hydrogel composition. Specifically, the silicone hydrogel composition is filled into a cavity of a polypropylene mold to perform the first photocuring reaction and the second photocuring reaction. In detail, the energy applied in the second photocuring reaction is higher than the energy applied in the first photocuring reaction. In one embodiment, the energy applied in the first photocuring reaction is higher than the energy required for the polymerization of the first hydrophilic monomer, the siloxane compound, and the first crosslinking monomer in the silicone hydrogel composition and lower than the energy required for the polymerization of the second hydrophilic monomer and the second crosslinking monomer. The energy applied in the second photocuring reaction is higher than the energy required for the polymerization of the second hydrophilic monomer and the second crosslinking monomer. In some embodiments, the energy applied in the first photocuring reaction is less than 50 $mJ/cm^2$, such as 40 $mJ/cm^2$, 30 $mJ/cm^2$, or 20 $mJ/cm^2$. In some embodiments, the energy applied in the second photocuring reaction is greater than 100 $mJ/cm^2$, such as 110 $mJ/cm^2$, 120 $mJ/cm^2$, or 130 $mJ/cm^2$.

In one embodiment, the method of manufacturing the silicone hydrogel lens further includes extracting the silicone hydrogel lens using an aqueous solution after performing the first photocuring reaction and the second photocuring reaction. Since the water-insoluble siloxane compound has been completely polymerized without residue, the obtained polymerized lens can be washed only using the aqueous solution to extract unreacted other components (e.g., the second hydrophilic monomer or the second crosslinking monomer).

Extraction of Silicone Hydrogel Lens

Extraction of the silicone hydrogel lens of the present disclosure includes extraction of the silicone hydrogel lens using water, methanol, and isopropanol. Specifically, extracting the silicone hydrogel lens using methanol or isopropanol includes obtaining the cured silicone hydrogel lens from a polypropylene mold and measuring a first weight of the silicone hydrogel lens. Subsequently, the silicone hydrogel lens is extracted with methanol or isopropanol at 45° C. for 2 hours. Thereafter, the silicone hydrogel lens is dried in an oven at 70° C. for 16 hours, and a second weight of the silicone hydrogel lens is measured. The difference (%) in weight between the first weight and the second weight is the weight of the methanol extracts or the isopropanol extracts.

Extracting the silicone hydrogel lens using water includes obtaining the cured silicone hydrogel lens from a polypropylene mold and measuring a first weight of the silicone hydrogel lens. Subsequently, the silicone hydrogel lens is extracted with water at 80° C. for 2 hours. Thereafter, the silicone hydrogel lens is dried in an oven at 70° C. for 16 hours, and a second weight of the silicone hydrogel lens is measured. The difference (%) in weight between the first weight and the second weight is the weight of the water extracts.

The following embodiments and comparative embodiments are used to describe in detail the silicone hydrogel composition and the method of manufacturing the silicone hydrogel lens (hereinafter, simply referred to as "lens" for convenience of explanation) and the effects thereof. However, the following embodiments are not intended to limit the present disclosure.

Comparison of Curing Reactions of Silicone Hydrogel Compositions Containing Different Photoinitiators Embodiment 1-1 to Embodiment 1-9

40 parts by weight of α-acrylamidopropyl-ω-butyl polydimethylsiloxane (having a number average molecular weight of less than 800), 25 parts by weight of N,N-dimethylacrylamide, 5 parts by weight of 2-hydroxyethyl methacrylate, 0.4 parts by weight of trimethylpropyltrimethacrylate, and 5 parts by weight of tert-amyl alcohol were mixed to form a silicone hydrogel composition. The above silicone hydrogel composition was divided into nine equal portions, and different photoinitiators listed in Table 1 below were added to the portions, respectively.

Next, the silicone hydrogel composition to which the photoinitiator was added was filled into cavities of polypropylene molds, and the curing reactions were carried out under ultraviolet light with different energies and illumination times. The curing results are listed in Table 1.

TABLE 1

| Embodiment | photoinitiator | parts by weight of photoinitiator | UV energy (mJ/cm$^2$) | illumination time (min) | curing ratio |
|---|---|---|---|---|---|
| 1-1 | D-1173 | 0.3 | 150 | 300 | uncured |
| 1-2 |  |  | 250 | 240 | uncured |
| 1-3 | TPO | 0.3 | 150 | 10 | 100% |
| 1-4 |  | 0.1 | 30 | 20 | 100% |
| 1-5 | I-819 | 0.3 | 150 | 5 | 100% |
| 1-6 |  | 0.1 | 30 | 10 | 100% |
| 1-7 | I-184 | 0.1 | 30 | 120 | 85% |
| 1-8 | I-1800 | 0.1 | 30 | 120 | 85% |
| 1-9 | I-1700 | 0.1 | 30 | 60 | 50% |

As can be seen from Table 1, when I-819, TPO, I-184, I-1800, and I-1700 were used as photoinitiators, the silicone hydrogel compositions could be cured with ultraviolet light of lower energy (30 mJ/cm$^2$). In particular, when 0.1 parts by weight of I-819 was used as the photoinitiator, the silicone hydrogel composition could be completely cured within 10 minutes of illumination, and when 0.1 parts by weight of TPO was used as the photoinitiator, the silicone hydrogel composition could be completely cured within 20 minutes of illumination. Further, when 0.3 parts by weight of I-819 was used as the photoinitiator, the silicone hydrogel composition could be completely cured within 5 minutes of illumination, and when 0.3 parts by weight of TPO was used as the photoinitiator, the silicone hydrogel composition could be completely cured within 10 minutes of illumination.

When I-184, I-1800 or I-1700 were used as the photoinitiators, the silicone hydrogel compositions required more than 60 minutes of illumination to be completely cured. However, when D-1173 was used as the photoinitiator, the silicone hydrogel composition could not be cured even if ultraviolet light of extremely high energy (150 and 250 mJ/cm$^2$) was applied.

Comparison of Curing rates of Hydrogel Composition Containing Non-Conjugated Vinyl Monomer and Silicone Hydrogel Composition Containing Acrylamide Monomer Embodiment 2

40 parts by weight of N-vinyl pyrrolidone, 0.1 parts by weight of 1,3,5-triallyl isocyanurate, and 5 parts by weight of tert-amyl alcohol were mixed to form a hydrogel composition. Next, 0.1 parts by weight of TPO was added as a photoinitiator and thoroughly mixed.

Next, the hydrogel composition of Embodiment 2 to which the photoinitiator was added was filled in a cavity of a polypropylene mold, and ultraviolet light of 30 mJ/cm$^2$ was applied to carry out a curing reaction. The relationship between the curing ratio and the time of the silicone hydrogel compositions of Embodiments 1~4 and 2 is shown in FIG. 1.

As can be seen from FIG. 1, compared to the hydrogel composition of Embodiment 2 (including the non-conjugated vinyl monomer such as N-vinyl pyrrolidone), the silicone hydrogel composition of Embodiment 1-4 (including the acrylamide-based monomer such as N,N-dimethylacrylamide) had higher curing rate. Specifically, the curing ratio of the silicone hydrogel composition of Embodiment 1-4 had reached about 90% before the hydrogel composition of Embodiment 2 began to cure. Therefore, when the silicone hydrogel compositions of Embodiment 1-4 and Embodiment 2 were mixed and subjected to a curing reaction, most of the acrylamide-based monomer had been cured before the non-conjugated vinyl monomer began to cure. When the non-conjugated vinyl monomer (e.g., N-vinyl pyrrolidone) began to cure, a majority of the siloxane compound such as α-acrylamidopropyl-ω-butyl polydimethylsiloxane had been completely cured, so that the unreacted siloxane compound which need to be further removed was insignificant.

Preparation of Lens Including Non-conjugated Vinyl Monomer and Acrylamide-based Monomer Embodiment 3-1

40 parts by weight of α-acrylamidopropyl-ω-butyl polydimethylsiloxane (siloxane compound 1), 25 parts by weight of N,N-dimethylacrylamide (DMA), 5 parts by weight of 2-hydroxyethyl methacrylate (HEMA), 30 parts by weight of N-vinyl pyrrolidone (NVP), 0.4 parts by weight of trimethylpropyl trimethacrylate (TMPTMA), 0.1 parts by weight of 1,3,5-triallyl isocyanurate (TAIC), 0.2 parts by weight of TPO photoinitiator, 0.02 parts by weight of a blue colorant (RB-19), and 5 parts by weight of tert-amyl alcohol were mixed to form a silicone hydrogel composition. Next, the silicone hydrogel composition was filled into a cavity of a polypropylene mold, and ultraviolet light of 30 mJ/cm$^2$ was applied for 6 minutes to carry out a first photocuring reaction. Subsequently, ultraviolet light of 132 mJ/cm$^2$ was applied for 6 minutes to carry out a second photocuring reaction to form a lens.

Embodiment 3-2

In this embodiment, the same components as in Embodiment 3-1 in addition to 5 parts by weight of HEMA replaced by 5 parts by weight of 2-hydroxyethyl acrylate (HEAA), and 0.4 parts by weight of TMPTMA replaced by 0.4 parts by weight of ethylene glycol diacrylate (bisacrylate (2)), and 0.2 parts by weight of TPO photoinitiator replaced by 0.1 parts by weight of TPO photoinitiator were mixed to form a silicone hydrogel composition. Next, the silicone hydrogel composition was filled into a cavity of a polypropylene mold, and ultraviolet light of 30 mJ/cm² was applied for 4 minutes to carry out a first photocuring reaction. Subsequently, ultraviolet light of 132 mJ/cm² was applied for 4 minutes to carry out a second photocuring reaction to form a lens.

Embodiment 3-3

In this embodiment, the same components as in Embodiment 3-2 in addition to 5 parts by weight of tert-amyl alcohol replaced by 10 parts by weight of tert-amyl alcohol were mixed to form a silicone hydrogel composition. Next, the silicone hydrogel composition was filled into a cavity of a polypropylene mold, and ultraviolet light of 30 mJ/cm² was applied for 4 minutes to carry out a first photocuring reaction. Subsequently, ultraviolet light of 132 mJ/cm² was applied for 4 minutes to carry out a second photocuring reaction to form a lens.

Embodiment 3-4

50 parts by weight of α-acrylamidopropyl-ω-butyl polydimethylsiloxane (siloxane compound 1), 25 parts by weight of N,N-dimethylacrylamide (DMA), 5 parts by weight of 2-hydroxyethyl acrylamide (HEAA), 20 parts by weight of N-vinyl pyrrolidone (NVP), 0.6 parts by weight of ethylene diacrylamide (bisacrylamide (2)), 0.1 parts by weight of 1,3,5-triallylisocyanurate (TAIC), 0.15 parts by weight of TPO photoinitiator, 0.02 parts by weight of a blue colorant (RB-19), and 15 parts by weight of tert-amyl alcohol were mixed to form a silicone hydrogel composition. Next, the silicone hydrogel composition was filled into a cavity of a polypropylene mold, and ultraviolet light of 30 mJ/cm² was applied for 6 minutes to carry out a first photocuring reaction. Subsequently, ultraviolet light of 132 mJ/cm² was applied for 6 minutes to carry out a second photocuring reaction to form a lens.

Embodiment 3-5

In this embodiment, the same components as in Embodiment 3-4 in addition to 0.6 parts by weight of ethylene diacrylamide (bisacrylamide (2)) replaced by 0.6 parts by weight of ethylene glycol diacrylate (bisacrylate (2)), and 0.15 parts by weight of TPO photoinitiator replaced by 0.1 parts by weight of TPO photoinitiator were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 3-6

In this embodiment, the same components as in Embodiment 3-4 in addition to 0.15 parts by weight of TPO photoinitiator replaced by 0.1 parts by weight of the TPO photoinitiator were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 3-7

In this embodiment, the same components as in Embodiment 3-5 in addition to 0.6 parts by weight of ethylene glycol diacrylate (bisacrylate (2)) replaced by 0.4 parts by weight of pentaerythritol tetra acrylate (tetraacrylate (4)) were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Next, the lenses of Embodiments 3-1 to 3-7 were taken out from the polypropylene molds, and the lenses were extracted with water and isopropanol according to the methods described above to obtain weights of water extracts and weights of isopropanol extracts.

Further, oxygen permeability, elongation, and refractive index of the lenses of Embodiments 3-1 to 3-7 were measured. The oxygen permeability was obtained by placing the lens in a phosphorate buffered saline and measuring using a polarographic method. Detailed procedures for measuring the oxygen permeability are known in the art and will not be described herein. Dk is usually acted as a unit of the oxygen permeability, and 1 Dk=$10^{-11}$ (cm³$O_2$ cm)/(cm³ sec mmHg). The elongation was measured by a tensile method. The refractive index was measured using an Abbe's refractometer. The water and isopropanol extraction results, oxygen permeability, elongation, and refractive index of the lenses of Embodiments 3-1 to 3-7 are listed in Tables 2 and 3 below.

TABLE 2

| | Embodiment | | | |
|---|---|---|---|---|
| | 3-1 | 3-2 | 3-3 | 3-4 |
| siloxane compound 1 | 40 | 40 | 40 | 50 |
| DMA | 25 | 25 | 25 | 25 |
| HEMA | 5 | | | |
| HEAA | | 5 | 5 | 5 |
| NVP | 30 | 30 | 30 | 20 |
| TMPTMA (3) | 0.4 | | | |
| bisacrylate (2) | | 0.4 | 0.4 | |
| tetraacrylate (4) | | | | |
| bisacrylamide (2) | | | | 0.6 |
| TAIC | 0.1 | 0.1 | 0.1 | 0.1 |
| TPO | 0.2 | 0.1 | 0.1 | 0.15 |
| RB-19 | 0.02 | 0.02 | 0.02 | 0.02 |
| tert-amyl alcohol | 5 | 5 | 10 | 15 |
| UV energy (mJ/cm²) | 30→132 | 30→132 | 30→132 | 30→132 |

TABLE 2-continued

| | Embodiment | | | |
|---|---|---|---|---|
| | 3-1 | 3-2 | 3-3 | 3-4 |
| time (min) | 6→6 | 4→4 | 4→4 | 6→6 |
| weight ratio of water extracts | 2.52% | 1.41% | 0.33% | 1.43% |
| weight ratio of isopropanol extracts | 8.23% | 5.13% | 2.85% | 1.08% |
| oxygen permeability (Dk) | 56.68 | 46.52 | 45.49 | 51.7 |
| elongation (%) | 312% | 260% | 334% | 247% |
| refractive index/% water | 1.395 | 1.4011/58% | 1.4035 | 1.4240 |
| clarity | 10 | 10 | 10 | 10 |

TABLE 3

| | Embodiment | | |
|---|---|---|---|
| | 3-5 | 3-6 | 3-7 |
| siloxane compound 1 | 50 | 50 | 50 |
| DMA | 25 | 25 | 25 |
| HEMA | | | |
| HEAA | 5 | 5 | 5 |
| NVP | 20 | 20 | 20 |
| TMPTMA (3) | | | |
| bisacrylate (2) | 0.6 | | |
| tetraacrylate (4) | | | 0.4 |
| bisacrylamide (2) | | 0.6 | |
| TAIC | 0.1 | 0.1 | 0.1 |
| TPO | 0.1 | 0.1 | 0.1 |
| RB-19 | 0.02 | 0.02 | 0.02 |
| tert-amyl alcohol | 15 | 15 | 15 |
| UV energy (mJ/cm$^2$) | 30→132 | 30→132 | 30→132 |
| time (min) | 8→8 | 8→8 | 8→8 |
| weight ratio of water extracts | 0.80% | 0.67% | 0.47% |
| weight ratio of isopropanol extracts | 1.80% | 1.46% | 1.84% |
| oxygen permeability (Dk) | 54.95 | 55.92 | 50.93 |
| elongation (%) | 276% | 214% | 283% |
| refractive index/% water | 1.4175/50% | 1.4203/48% | 1.4167/50% |
| clarity | 10 | 10 | 10 |

As can be seen from Tables 2 and 3, the lenses made from the silicone hydrogel compositions of the present disclosure were all optically transparent. Further, the lenses made from the silicone hydrogel compositions of the present disclosure had elongations of more than 200%, and thus had flexibility and elasticity suitable for use in contact lenses.

It is worth mentioning that the weight ratios of the isopropanol extracts of the lenses made using the silicone hydrogel compositions of the present disclosure were low, so that the produced lenses do not need to be washed using an organic solvent. However, it should be noted that the weight ratios of the water extracts and those of the isopropanol extracts of Embodiments 3-2 to 3-7 were similar (less than 4%), but the weight ratio of the water extracts and that of the isopropanol extracts of Embodiment 3-1 were significantly different (about 5.7%). It was because the silicone hydrogel composition of Embodiment 3-1 included the hydrophilic monomer having the methacrylate group (i.e., HEMA) and the crosslinking monomer having the methacrylate group (i.e., TMPTMA). Since steric hindrances of the methacrylate groups increased the energy required for the polymerization of these compounds, the residual isopropanol extracts were increased after the silicone hydrogel composition was cured.

Preparation of Lens Including Ionic Monomer

Embodiment 4-1

45 parts by weight of α-acrylamidopropyl-ω-butyl polydimethylsiloxane (siloxane compound 1), 25 parts by weight of N,N-dimethylacrylamide (DMA), 5 parts by weight of 2-hydroxyethyl acrylamide (HEAA), 25 parts by weight of N-vinyl pyrrolidone (NVP), 0.6 parts by weight of ethylene glycol diacrylate (bisacrylate (2)), 0.1 parts by weight of 1,3,5-triallyl isocyanurate (TAIC), 0.1 parts by weight of TPO photoinitiator, 0.02 parts by weight of a blue colorant (RB-19), and 15 parts by weight of tert-amyl alcohol were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 120 mJ/cm$^2$ was applied for 8 minutes to carry out a second photocuring reaction to form a lens.

Embodiment 4-2

In this embodiment, the same components as in Embodiment 4-1 in addition to additionally added 1 part by weight of acrylic acid were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 120 mJ/cm$^2$ was applied for 8 minutes to carry out a second photocuring reaction to form a lens.

Embodiment 4-3

In this embodiment, the same components as in Embodiment 4-2 in addition to 25 parts by weight of NVP replaced by 30 parts by weight of NVP were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 120 mJ/cm$^2$ was applied for 8 minutes to carry out a second photocuring reaction to form a lens.

Next, the lenses of Embodiments 4-1 to 4-3 were taken out from the polypropylene molds, and the lenses were extracted with water and isopropanol according to the methods described above to obtain weights of water extracts and those of isopropanol extracts. Further, oxygen permeability, elongation, and refractive index of the lenses of Embodiments 4-1 to 4-3 were measured. The water and isopropanol extraction results, oxygen permeability, elongation, and refractive index of the lenses of Embodiments 4-1 to 4-3 are listed in Table 4 below.

TABLE 4

|  | Embodiment | | |
|---|---|---|---|
|  | 4-1 | 4-2 | 4-3 |
| siloxane compound 1 | 45 | 45 | 40 |
| DMA | 25 | 25 | 25 |
| HEAA | 5 | 5 | 5 |
| NVP | 25 | 25 | 30 |
| bisacrylate (2) | 0.6 | 0.6 | 0.6 |
| acrylic acid |  | 1 | 1 |
| TAIC | 0.1 | 0.1 | 0.1 |
| TPO | 0.1 | 0.1 | 0.1 |
| RB-19 | 0.02 | 0.02 | 0.02 |
| tert-amyl alcohol | 15 | 15 | 15 |
| UV energy (mJ/cm$^2$) | 30→120 | 30→120 | 30→120 |
| time (min) | 8→8 | 8→8 | 8→8 |
| weight ratio of water extracts | 1.76% | 2.13% | 1.07% |
| weight ratio of isopropanol extracts | 2.08% | 3.50% | 1.43% |
| oxygen permeability (Dk) | 61 | 62 | 60 |
| elongation (%) | 276% | 344% | 270% |
| refractive index/ % water | 1.4083 | 1.4200 | 1.4072 |
| clarity | 10 | 10 | 10 |

As can be seen from Table 4, the lenses made from the silicone hydrogel compositions with or without the ionic monomer (i.e., acrylic acid) had elongations of more than 250% and were all optically transparent. In addition, the weight ratios of the isopropanol extracts of the lenses made from the silicone hydrogel compositions were low and similar to the weight ratios of the water extracts (less than 1.4%). That is, the silicone hydrogel compositions including the ionic monomer were also suitable for the preparation of contact lenses.

Preparation of Lenses Including Different Crosslinking Monomers

Embodiment 5-1

40 parts by weight of α-acrylamidopropyl-ω-butyl polydimethylsiloxane (siloxane compound 1), 25 parts by weight of N,N-dimethylacrylamide (DMA), 5 parts by weight of 2-hydroxyethyl acrylamide (HEAA), 30 parts by weight of N-vinyl pyrrolidone (NVP), 1.2 parts by weight of ethylene glycol diacrylate (bisacrylate (2)), 1 part by weight of acrylic acid, 0.1 parts by weight of 1,3,5-triallyl isocyanurate (TAIC), 0.1 parts by weight of TPO photoinitiator, 0.02 parts by weight of a blue colorant (RB-19) and 15 parts by weight of tert-amyl alcohol were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Embodiment 5-2

In this embodiment, the same components as in Embodiment 5-1 in addition to 1.2 parts by weight of ethylene glycol diacrylate (bisacrylate (2)) replaced by 0.8 parts by weight of trimethylolpropane triacrylate (triacrylate (3)) were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Embodiment 5-3

In this embodiment, the same components as in Embodiment 5-1 were mixed to form a silicone hydrogel composition. Next, the silicone hydrogel composition was filled into a cavity of a polypropylene mold, and ultraviolet light of 10 mJ/cm$^2$ was applied for 10 minutes to carry out a first photocuring reaction. Subsequently, ultraviolet light of 120 mJ/cm$^2$ was applied for 10 minutes to carry out a second photocuring reaction to form a lens.

Embodiment 5-4

In this embodiment, the same components as in Embodiment 5-2 were mixed to form a silicone hydrogel composition. Next, the silicone hydrogel composition was filled into a cavity of a polypropylene mold, and ultraviolet light of 10 mJ/cm$^2$ was applied for 8 minutes to carry out a first photocuring reaction. Subsequently, ultraviolet light of 120 mJ/cm$^2$ was applied for 8 minutes to carry out a second photocuring reaction to form a lens.

Next, the lenses of Embodiments 5-1 to 5-4 were taken out from the polypropylene molds, and the lenses were extracted using isopropanol according to the method described above to obtain weights of isopropanol extracts. Further, oxygen permeability, elongation, and refractive index of the lenses of Embodiments 5-1 to 5-4 were measured. The isopropanol extraction results, oxygen permeability, elongation, and refractive index of the lenses of Embodiments 5-1 to 5-4 are listed in Table 5 below.

TABLE 5

|  | Embodiment | | | |
|---|---|---|---|---|
|  | 5-1 | 5-2 | 5-3 | 5-4 |
| siloxane compound 1 | 40 | 40 | 40 | 40 |
| DMA | 25 | 25 | 25 | 25 |
| HEAA | 5 | 5 | 5 | 5 |
| NVP | 30 | 30 | 30 | 30 |
| bisacrylate (2) | 1.2 |  | 1.2 |  |
| triacrylate (3) |  | 0.8 |  | 0.8 |
| acrylic acid | 1 | 1 | 1 | 1 |
| TAIC | 0.1 | 0.1 | 0.1 | 0.1 |
| TPO | 0.1 | 0.1 | 0.1 | 0.1 |
| RB-19 | 0.02 | 0.02 | 0.02 | 0.02 |
| tert-amyl alcohol | 15 | 15 | 15 | 15 |
| UV energy (mJ/cm$^2$) | 30→132 | 30→132 | 10→120 | 10→120 |
| time (min) | 8→8 | 8→8 | 10→10 | 8→8 |
| weight ratio of isopropanol extracts | 3.07% | 5.90% | 1.47% | 0.30% |
| oxygen permeability (Dk) | 66.32 | 66.79 | not measured | not measured |
| elongation (%) | 150% | 268% | 168% | 215% |
| refractive index | 1.4064 | 1.4040 | 1.4072 | 1.4034 |

As can be seen from Table 5, when the first photocuring reaction was performed on the same silicone hydrogel composition using a lower ultraviolet light energy, the weight ratio of the isopropanol extracts of the produced lens could be lowered. Further, compared Embodiment 5-1 with Embodiment 5-3 and compared Embodiment 5-2 with Embodiment 5-4, it was understood that changing the ultraviolet light energy for performing the photocuring reaction did not affect the properties such as elongation and refractive index of the formed lens.

Curing of Silicone Hydrogel Compositions Under Different Conditions

Embodiment 6-1

40 parts by weight of α-acrylamidopropyl-ω-butyl polydimethylsiloxane (siloxane compound 1), 25 parts by weight of N,N-dimethylacrylamide (DMA), 5 parts by weight of 2-hydroxyethyl acrylamide (HEAA), 30 parts by weight of N-vinyl pyrrolidone (NVP), 0.6 parts by weight of ethylene glycol diacrylate (bisacrylate (2)), 1 part by weight of acrylic acid, 0.1 parts by weight of 1,3,5-triallyl isocyanurate (TAIC), 0.1 parts by weight of TPO photoinitiator, 0.02 parts by weight of a blue colorant (RB-19) and 15 parts by weight of tert-amyl alcohol were mixed to form a silicone hydrogel composition. Next, the silicone hydrogel composition was filled into a cavity of a polypropylene mold, and photocuring reactions were carried out using a lens manufacturing apparatus. The lens manufacturing apparatus was set to sequentially apply ultraviolet light of 30 mJ/cm² for 4 minutes, ultraviolet light of 225 mJ/cm² for 4 minutes, ultraviolet light of 300 mJ/cm² of for 2 minutes, and ultraviolet light of 470 mJ/cm² for 2 minutes to form a lens.

Embodiment 6-2

In this embodiment, the same components as in Embodiment 6-1 in addition to 40 parts by weight of the siloxane compound 1 replaced by 45 parts by weight of the siloxane compound 1, and 30 parts by weight of NVP replaced by 25 parts by weight of NVP were mixed to form a silicone hydrogel composition. Next, the silicone hydrogel composition was filled into a cavity of a polypropylene mold, and photocuring reactions were carried out using the lens manufacturing apparatus to form a lens. The setting of the lens manufacturing apparatus was the same as that of Embodiment 6-1.

Embodiment 6-3

In this embodiment, the same components as in Embodiment 6-1 were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 6-4

In this embodiment, the same components as in Embodiment 6-2 were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 6-5

In this embodiment, the same components as in Embodiment 6-1 were mixed to form a silicone hydrogel composition. Next, the silicone hydrogel composition was filled into a cavity of a polypropylene mold, and ultraviolet light of 15 mJ/cm² was applied for 8 minutes to carry out a first photocuring reaction. Subsequently, ultraviolet light of 160 mJ/cm² was applied for 8 minutes to carry out a second photocuring reaction to form a lens.

Embodiment 6-6

In this embodiment, the same components as in Embodiment 6-2 were mixed to form a silicone hydrogel composition. Next, the silicone hydrogel composition was filled into a cavity of a polypropylene mold, and ultraviolet light of 15 mJ/cm² was applied for 8 minutes to carry out a first photocuring reaction. Subsequently, ultraviolet light of 160 mJ/cm² was applied for 8 minutes to carry out a second photocuring reaction to form a lens.

Next, the lenses of Embodiments 6-1 to 6-6 were taken out from the polypropylene molds, and the lenses were extracted using water, methanol, and isopropanol according to the methods described above to obtain weights of water extracts, those of methanol extracts and those of isopropanol extracts. Further, a diameter, base curve, oxygen permeability, elongation, and refractive index of the lenses of Embodiments 6-1 to 6-6 were measured. The water, methanol, and isopropanol extraction results, diameter, base curve, oxygen permeability, elongation, and refractive index of the lenses of Embodiments 6-1 to 6-6 are listed in Tables 6 and 7 below.

TABLE 6

|  | Embodiment | | | |
| --- | --- | --- | --- | --- |
|  | 6-1 | 6-2 | 6-3 | 6-4 |
| siloxane compound 1 | 40 | 45 | 40 | 45 |
| DMA | 25 | 25 | 25 | 25 |
| HEAA | 5 | 5 | 5 | 5 |
| NVP | 30 | 25 | 30 | 25 |
| bisacrylate (2) | 0.6 | 0.6 | 0.6 | 0.6 |
| acrylic acid | 1 | 1 | 1 | 1 |
| TAIC | 0.1 | 0.1 | 0.1 | 0.1 |
| TPO | 0.1 | 0.1 | 0.1 | 0.1 |
| RB-19 | 0.02 | 0.02 | 0.02 | 0.02 |
| tert-amyl alcohol | 15 | 15 | 15 | 15 |
| curing method | lens manufacturing apparatus | lens manufacturing apparatus | non-lens manufacturing apparatus | non-lens manufacturing apparatus |
| UV energy (mJ/cm²) | 30→225→300→470 | 30→225→300→470 | 30→132 | 30→132 |
| time (min) | 4→4→2→2 | 4→4→2→2 | 8→8 | 8→8 |
| weight ratio of water extracts | 0.60% | 0.30% | 0.81% | 1.10% |

TABLE 6-continued

| | Embodiment | | | |
|---|---|---|---|---|
| | 6-1 | 6-2 | 6-3 | 6-4 |
| weight ratio of methanol extracts | 1.09% | 1.31% | 1.21% | 1.74% |
| weight ratio of isopropanol extracts | 2.00% | 1.50% | 2.32% | 2.90% |
| diameter (mm) | 14.3 | 14.0 | 14.49 | 14.15 |
| base curve (mm) | 8.57 | 8.43 | 8.50 | 8.30 |
| oxygen permeability (Dk) | not measured | not measured | not measured | not measured |
| elongation (%) | 300% | 280% | 290% | 307% |
| refractive index | 1.4016 | 1.4070 | 1.4040 | 1.4060 |

TABLE 7

| | Embodiment | |
|---|---|---|
| | 6-5 | 6-6 |
| siloxane compound 1 | 40 | 45 |
| DMA | 25 | 25 |
| HEAA | 5 | 5 |
| NVP | 30 | 25 |
| bisacrylate (2) | 0.6 | 0.6 |
| acrylic acid | 1 | 1 |
| TAIC | 0.1 | 0.1 |
| TPO | 0.1 | 0.1 |
| RB-19 | 0.02 | 0.02 |
| tert-amyl alcohol | 15 | 15 |
| curing method | non-lens manufacturing apparatus | non-lens manufacturing apparatus |
| UV energy (mJ/cm$^2$) | 15→160 | 15→160 |
| time (min) | 8→8 | 8→8 |
| weight ratio of water extracts | 0.79% | 1.13% |
| weight ratio of methanol extracts | | |
| weight ratio of isopropanol extracts | 2.61% | 2.84% |
| diameter (mm) | 14.79 | 14.2 |
| base curve (mm) | 8.54 | 8.14 |
| oxygen permeability (Dk) | 66.24 | 74.29 |
| elongation (%) | 213% | 352% |
| refractive index | 1.4019 | 1.4067 |

It can be seen from Table 6 and Table 7 that when the lens manufacturing apparatus was used to cure the silicone hydrogel compositions, the weight ratios of the water extracts and the weight ratios of the isopropanol extracts were both 2% or less, indicating that the silicone hydrogel compositions were completely cured. Further, the weight ratios of the water extracts, those of the methanol extracts, and those of the isopropanol extracts of the lenses of Embodiments 6-1 to 6-6 were low (lower than or equal to 2.9%) regardless of whether or not the lens manufacturing apparatus for curing the silicone hydrogel compositions was used.

Comparison of Lens Properties of Siloxane Compounds Containing Different Number Average Molecular Weights Embodiment 7-1

40 parts by weight of α-acrylamidopropyl-ω-butyl polydimethylsiloxane (number average molecular weight of about 1000, siloxane compound 2), 25 parts by weight of N,N-dimethylacrylamide (DMA), 5 parts by weight of 2-hydroxyethyl acrylamide (HEAA), 30 parts by weight of N-vinyl pyrrolidone (NVP), 0.6 parts by weight of ethylene glycol diacrylate (bisacrylate (2)), 1 part by weight of acrylic acid, 0.1 parts by weight of 1,3,5-triallyl isocyanurate (TAIC), 0.1 parts by weight of TPO photoinitiator, 0.02 parts by weight of a blue colorant (RB-19) and 15 parts by weight of tert-amyl alcohol were mixed to form a silicone hydrogel composition. Next, the silicone hydrogel composition was filled into a cavity of a polypropylene mold, and ultraviolet light of 35 mJ/cm$^2$ was applied for 4 minutes to carry out a first photocuring reaction. Subsequently, ultraviolet light of 133 mJ/cm$^2$ was applied for 4 minutes to perform a second photocuring reaction to form a lens.

Embodiment 7-2

In this embodiment, the same components as in Embodiment 7-1 in addition to 40 parts by weight of the siloxane compound 2 replaced by 40 parts by weight of α-acrylamidopropyl-ω-butyl polydimethylsiloxane (number average molecular weight of less than 800, siloxane compound 1) were mixed to form a silicone hydrogel composition. Next, the silicone hydrogel composition was filled into a cavity of a polypropylene mold, and ultraviolet light of 35 mJ/cm$^2$ was applied for 4 minutes to carry out a first photocuring reaction. Subsequently, ultraviolet light of 133 mJ/cm$^2$ was applied for 4 minutes to perform a second photocuring reaction to form a lens.

Embodiment 7-3

In this embodiment, the same components as in Embodiment 7-1 in addition to 40 parts by weight of the siloxane compound 2 replaced by 40 parts by weight of α-acryloxypropyl-ω-butyl polydimethylsiloxane (number average molecular weight of about 820, siloxane compound 3), and 0.1 parts by weight of TPO photoinitiator replaced by 0.3 parts by weight of TPO photoinitiator, and 15 parts by weight of tert-amyl alcohol replaced by 5 parts by weight of tert-amyl alcohol were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to perform a second photocuring reaction to form a lens.

Embodiment 7-4

In this embodiment, the same components as in Embodiment 7-3 in addition to no acrylic acid was added were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 7-5

In this embodiment, the same components as in Embodiment 7-3 in addition to 25 parts by weight of DMA replaced by 20 parts by weight of DMA, and 5 parts by weight of HEAA replaced by 10 parts by weight of HEAA were mixed to form a silicone hydrogel composition. Next, the silicone hydrogel composition was filled into a cavity of a polypropylene mold, and ultraviolet light of 30 mJ/cm² was applied for 8 minutes to carry out a first photocuring reaction. Subsequently, ultraviolet light of 132 mJ/cm² was applied for 8 minutes to carry out a second photocuring reaction to form a lens.

Embodiment 7-6

In this embodiment, the same components as in Embodiment 7-5 in addition to no acrylic acid was added were mixed to form a silicone hydrogel composition. Next, the silicone hydrogel composition was filled into a cavity of a polypropylene mold, and ultraviolet light of 30 mJ/cm² was applied for 10 minutes to carry out a first photocuring reaction. Subsequently, ultraviolet light of 132 mJ/cm² was applied for 10 minutes to carry out a second photocuring reaction to form a lens.

Embodiment 7-7

In this embodiment, the same components as in Embodiment 7-1 in addition to 40 parts by weight of the siloxane compound 2 replaced by 40 parts by weight of bis-α,ω-acryloxypropyl polydimethylsiloxane (number average molecular weight of about 1200, siloxane compound 4) were mixed to form a silicone hydrogel composition. Next, the silicone hydrogel composition was filled into a cavity of a polypropylene mold, and ultraviolet light of 30 mJ/cm² was applied for 4 minutes to carry out a first photocuring reaction. Subsequently, ultraviolet light of 132 mJ/cm² was applied for 4 minutes to carry out a second photocuring reaction to form a lens.

Embodiment 7-8

In this embodiment, the same components as in Embodiment 7-7 in addition to 40 parts by weight of the siloxane compound 4 replaced by 5 parts by weight of the siloxane compound 4, and additionally added 35 parts by weight of the siloxane compound 1 were mixed to form a silicone hydrogel composition. Next, the silicone hydrogel composition was filled into a cavity of a polypropylene mold, and ultraviolet light of 30 mJ/cm² was applied for 6 minutes to carry out a first photocuring reaction. Subsequently, ultraviolet light of 132 mJ/cm² was applied for 6 minutes to carry out a second photocuring reaction to form a lens.

Embodiment 7-9

In this embodiment, the same components as in Embodiment 7-8 in addition to 35 parts by weight of the siloxane compound 1 replaced by 35 parts by weight of the siloxane compound 2 were mixed to form a silicone hydrogel composition. Next, the silicone hydrogel composition was filled into a cavity of a polypropylene mold, and ultraviolet light of 30 mJ/cm² was applied for 6 minutes to carry out a first photocuring reaction. Subsequently, ultraviolet light of 132 mJ/cm² was applied for 6 minutes to carry out a second photocuring reaction to form a lens.

Embodiment 7-10

In this embodiment, the same components as in Embodiment 7-8 in addition to 35 parts by weight of the siloxane compound 1 replaced by 30 parts by weight of the siloxane compound 1, and 25 parts by weight of DMA replaced by 30 parts by weight of DMA were mixed to form a silicone hydrogel composition. Next, the silicone hydrogel composition was filled into a cavity of a polypropylene mold, and ultraviolet light of 30 mJ/cm² was applied for 4 minutes to carry out a first photocuring reaction. Subsequently, ultraviolet light of 132 mJ/cm² was applied for 4 minutes to carry out a second photocuring reaction to form a lens.

Next, the lenses of Embodiments 7-1 to 7-10 were taken out from the polypropylene molds, and the lenses were extracted with water and isopropanol according to the methods described above to obtain weights of water extracts and those of isopropanol extracts. Further, a diameter, base curve, oxygen permeability, elongation, and refractive index of the lenses of Embodiments 7-1 to 7-10 were measured. The water and isopropanol extraction results, diameter, base curve, oxygen permeability, elongation, and refractive index of the lenses of Embodiments 7-1 to 7-10 are shown in Tables 8 to 10.

TABLE 8

|  | Embodiment | |
| --- | --- | --- |
|  | 7-1 | 7-2 |
| siloxane compound 1 (Mn <800) |  | 40 |
| siloxane compound 2 (Mn ~1000) | 40 |  |
| DMA | 25 | 25 |
| HEAA | 5 | 5 |
| NVP | 30 | 25 |
| bisacrylate (2) | 0.6 | 0.6 |
| acrylic acid | 1 | 1 |
| TAIC | 0.1 | 0.1 |
| TPO | 0.1 | 0.1 |
| RB-19 | 0.02 | 0.02 |
| tert-amyl alcohol | 15 | 15 |
| UV energy (mJ/cm²) | 35→133 | 35→133 |
| time (min) | 4→4 | 4→4 |
| weight ratio of isopropanol extracts | 5.49% | 1.56% |
| diameter (mm) | 14.29 | 14.49 |
| base curve (mm) | 8.39 | 8.86 |
| oxygen permeability (Dk) | 63 | 61 |
| elongation (%) | 320% | 348% |
| refractive index | 1.4022 | 1.4017 |

TABLE 9

| | Embodiment | | | |
|---|---|---|---|---|
| | 7-3 | 7-4 | 7-5 | 7-6 |
| siloxane compound 3 (Mn ~820) | 40 | 40 | 40 | 40 |
| DMA | 25 | 25 | 20 | 20 |
| HEAA | 5 | 5 | 10 | 10 |
| NVP | 30 | 30 | 30 | 30 |
| bisacrylate (2) | 0.6 | 0.6 | 0.6 | 0.6 |
| acrylic acid | 1 | | 1 | |
| TAIC | 0.1 | 0.1 | 0.1 | 0.1 |
| TPO | 0.3 | 0.3 | 0.3 | 0.3 |
| RB-19 | 0.02 | 0.02 | 0.02 | 0.02 |
| tert-amyl alcohol | 5 | 5 | 5 | 5 |
| UV energy (mJ/cm$^2$) | 30→132 | 30→132 | 30→132 | 30→132 |
| time (min) | 8→8 | 8→8 | 8→8 | 10→10 |
| weight ratio of water extracts | 1.01% | 0.58% | 1.05% | 0.63% |
| weight ratio of isopropanol extracts | 2.05% | 1.53% | 1.98% | 1.85% |
| oxygen permeability (Dk) | 57.52 | 59.10 | 60.20 | 62.21 |
| elongation (%) | 295% | 335% | 263% | 287% |
| refractive index | 1.4195 | 1.4240 | 1.4220 | 1.4291 |

TABLE 10

| | Embodiment | | | |
|---|---|---|---|---|
| | 7-7 | 7-8 | 7-9 | 7-10 |
| siloxane compound 4 (Mn ~1200) | 40 | 5 | 5 | 5 |
| siloxane compound 1 (Mn <800) | | 35 | | 30 |
| siloxane compound 2 (Mn ~1000) | | | 35 | |
| DMA | 25 | 25 | 25 | 30 |
| HEAA | 5 | 5 | 5 | 5 |
| NVP | 30 | 30 | 30 | 30 |
| bisacrylate (2) | 0.6 | 0.6 | 0.6 | 0.6 |
| acrylic acid | 1 | 1 | 1 | 1 |
| TAIC | 0.1 | 0.1 | 0.1 | 0.1 |
| TPO | 0.1 | 0.1 | 0.1 | 0.1 |
| RB-19 | 0.02 | 0.02 | 0.02 | 0.02 |
| tert-amyl alcohol | 15 | 15 | 15 | 15 |
| UV energy (mJ/cm$^2$) | 30→132 | 30→132 | 30→132 | 30→132 |
| time (min) | 4→4 | 6→6 | 6→6 | 4→4 |
| weight ratio of isopropanol extracts | 0.88% | 0.6% | 2.40% | 0.87% |
| diameter (mm) | 12.9 | 14.48 | 14.38 | 14.86 |
| base curve (mm) | 7.69 | 8.64 | 8.55 | 8.6 |
| oxygen permeability (Dk) | not measured | 98.75 | 83.21 | not measured |
| elongation (%) | low | 280 | 288 | 250 |
| refractive index | 1.4351 | 1.4046 | 1.4022 | 1.4016 |

It can be seen from Table 8 that the lenses containing different siloxane compounds with different number average molecular weights had similar properties (e.g., oxygen permeability, elongation, and refractive index, etc.), but the lens containing the siloxane compound with higher number average molecular weight had higher weight ratio of the isopropanol extracts, indicating that the lens containing the siloxane compound with higher number average molecular weight had lower curing efficiency.

It can be seen from Table 9 that compared with the lens containing the siloxane compound 1 capped with the acrylamide groups, the lenses containing the siloxane compound 3 capped with the acryloyloxy groups had very low weight ratios of the water extracts and those of the isopropanol extracts.

As can be seen from Table 10 that the lens made from the silicone hydrogel composition of Embodiments 7-7 includes the siloxane compound 4 capped with the acryloyloxy groups was a hard lens. The lens of Embodiment 7-7 had low elongation and a small diameter compared with the lenses of Embodiments 7-8 to 7-10. From Embodiments 7-8 to 7-10, it is understood that compared with the silicone hydrogel composition containing the siloxane compound 2 having the large number average molecular weight, the lenses made from the silicone hydrogel compositions containing the siloxane compound 1 having the small number average molecular weight had the low weight ratios of the isopropanol extracts.

Comparison of Lenses Including and Excluding Methacrylate Monomers

Embodiment 8-1

40 parts by weight of 3-tris(trimethyl siloxy) silylpropyl acrylamide (TRISAm), 25 parts by weight of N,N-dimethylacrylamide (DMA), 5 parts by weight of 2-hydroxyethyl methacrylate (HEMA), 30 parts by weight of N-vinyl pyrrolidone (NVP), 0.4 parts by weight of trimethylpropyl trimethacrylate (TMPTMA), 0.1 parts by weight 1,3,5-triallyl isocyanurate (TAIC), 0.3 parts by weight of TPO photoinitiator, 0.02 parts by weight of a blue colorant (RB-19), and parts by weight of tert-amyl alcohol were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Embodiment 8-2

In this embodiment, the same components as in Embodiment 8-1 in addition to 0.4 parts by weight of TMPTMA replaced by 0.6 parts by weight of ethylene glycol dimethacrylate (EGDMA) were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Embodiment 8-3

In this embodiment, the same components as in Embodiment 8-1 in addition to 25 parts by weight of DMA replaced by 20 parts by weight of DMA, 5 parts by weight of HEMA replaced by 10 parts by weight of HEMA, and 30 parts by weight of NVP replaced by 25 parts by weight of NVP, and additionally added parts by weight of poly(ethylene glycol) methacrylate (PEGMA) were mixed to form a silicone hydrogel composition. Next, the silicone hydrogel composition was filled into a cavity of a polypropylene mold, and ultraviolet light of 30 mJ/cm$^2$ was applied for 10 minutes to carry out a first photocuring reaction. Subsequently, ultraviolet light of 132 mJ/cm$^2$ was applied for 10 minutes to carry out a second photocuring reaction to form a lens.

Embodiment 8-4

In this embodiment, the same components as in Embodiment 8-1 in addition to 5 parts by weight of HEMA replaced by 5 parts by weight of 2-hydroxyethyl acrylamide (HEAA), and 0.4 parts by weight of TMPTMA replaced by 0.6 parts by weight of ethylene glycol diacrylate (bisacrylate (2)) were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Embodiment 8-5

In this embodiment, the same components as in Embodiment 8-4 in addition to 0.6 parts by weight of ethylene glycol diacrylate (bisacrylate (2)) replaced by 0.4 parts by weight of trimethylolpropane triacrylate (triacrylate (3)) were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Comparative Embodiment 1

In this embodiment, the same components as in Embodiment 8-1 in addition to 40 parts by weight of TRISAm replaced by 40 parts by weight of 3-tris(trimethylsiloxy) silylpropyl methacrylate (TRIS) were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Comparative Embodiment 2

In this embodiment, the same components as in Comparative Embodiment 1 in addition to 0.4 parts by weight of TMPTMA replaced by 0.6 parts by weight of EGDMA were mixed to form a silicone hydrogel composition. Next, the silicone hydrogel composition was filled into a cavity of a polypropylene mold, and ultraviolet light of 30 mJ/cm$^2$ was applied for 8 minutes to carry out a first photocuring reaction. Subsequently, ultraviolet light of 132 mJ/cm$^2$ was applied for 8 minutes to carry out a second photocuring reaction to form a lens.

Comparative Embodiment 3

In this Embodiment, the same components as in Comparative Embodiment 1 in addition to 25 parts by weight of DMA replaced by 20 parts by weight of DMA, 5 parts by weight of HEMA replaced by 10 parts by weight of HEMA, 30 parts by weight of NVP replaced by 25 parts by weight of NVP, and additionally added 5 parts by weight of poly (ethylene glycol) methacrylate (PEGMA) were mixed to form a silicone hydrogel composition. Next, the silicone hydrogel composition was filled into a cavity of a polypropylene mold, and ultraviolet light of 30 mJ/cm$^2$ was applied for 10 minutes to carry out a first photocuring reaction. Subsequently, ultraviolet light of 132 mJ/cm$^2$ was applied for 10 minutes to carry out a second photocuring reaction to form a lens.

Next, the lenses of Embodiments 8-1 to 8-5 and Comparative Embodiments 1 to 3 were taken out from the polypropylene molds, and the lenses were extracted with water and isopropanol according to the methods described above to obtain weights of water extracts and those of isopropanol extracts. Further, oxygen permeability, elongation, and refractive index of the lenses of Embodiments 8-1 to 8-5 and Comparative Embodiments 1 to 3 were measured. The water and isopropanol extraction results, oxygen permeability, elongation, and refractive index of the lenses of Embodiments 8-1 to 8-5 and Comparative Embodiments 1 to 3 are listed in Table 11 and Table 12 below.

TABLE 11

| | Embodiment | | | | |
|---|---|---|---|---|---|
| | 8-1 | 8-2 | 8-3 | 8-4 | 8-5 |
| TRISAm | 40 | 40 | 40 | 40 | 40 |
| TRIS | | | | | |
| DMA | 25 | 25 | 20 | 25 | 25 |
| HEMA | 5 | 5 | 10 | | |
| HEAA | | | | 5 | 5 |
| PEGMA | | | 5 | | |
| NVP | 30 | 30 | 25 | 30 | 30 |
| TMPTMA | 0.4 | | 0.4 | | |
| EGDMA | | 0.6 | | | |
| bisacrylate (2) | | | | 0.6 | |
| triacrylate (3) | | | | | 0.4 |
| TAIC | 0.1 | 0.1 | 0.1 | 0.1 | 0.1 |
| TPO | 0.3 | 0.3 | 0.3 | 0.3 | 0.3 |
| RB-19 | 0.02 | 0.02 | 0.02 | 0.02 | 0.02 |
| tert-amyl alcohol | 5 | 5 | 5 | 5 | 5 |
| UV energy (mJ/cm$^2$) | 30→132 | 30→132 | 30→132 | 30→132 | 30→132 |
| time (min) | 8→8 | 8→8 | 10→10 | 8→8 | 8→8 |
| weight ratio of water extracts | 2.13% | 1.84% | 1.95% | 1.05% | 1.14% |
| weight ratio of isopropanol extracts | 3.53% | 2.25% | 2.85% | 1.98% | 2.17% |
| oxygen permeability (Dk) | 56.17 | 50.52 | 58.21 | 57.34 | 59.31 |
| elongation (%) | 398% | 295% | 405% | 385% | 375% |
| refractive index | 1.3864 | 1.3912 | 1.3886 | 1.3841 | 1.3897 |

TABLE 12

| | Comparative Embodiment | | |
|---|---|---|---|
| | 1 | 2 | 3 |
| TRISAm | | | |
| TRIS | 40 | 40 | 40 |
| DMA | 25 | 25 | 20 |
| HEMA | 5 | 5 | 10 |
| HEAA | | | |
| PEGMA | | | 5 |
| NVP | 30 | 30 | 25 |
| TMPTMA | 0.4 | | 0.4 |
| EGDMA | | 0.6 | |
| bisacrylate (2) | | | |
| triacrylate (3) | | | |
| TAIC | 0.1 | 0.1 | 0.1 |
| TPO | 0.3 | 0.3 | 0.3 |
| RB-19 | 0.02 | 0.02 | 0.02 |
| tert-amyl alcohol | 5 | 5 | 5 |
| UV energy (mJ/cm$^2$) | 30→132 | 30→132 | 30→132 |
| time (min) | 8→8 | 8→8 | 10→10 |
| weight ratio of water extracts | 4.67% | 3.97% | 4.29% |
| weight ratio of isopropanol extracts | 14.21% | 11.54% | 13.80% |
| oxygen permeability (Dk) | 54.98 | 47.25 | 56.76 |
| elongation (%) | 428% | 256% | 388% |
| refractive index | 1.3862 | 1.397 | 1.388 |

As can be seen from Tables 11 and 12, when TRIS was used as the siloxane compound (Comparative Embodiments 1 to 3), the weight ratios of the water extracts and those of the isopropanol extracts of the lenses were significantly increased. Steric hindrance of the methacrylate group in the TRIS structure increased the energy required for the polymerization of the compound, and thus the residual water extracts and the isopropanol extracts were increased after the silicone hydrogel composition was cured. Further, when ethylene glycol diacrylate (bisacrylate (2)) or trimethylolpropane triacrylate (triacrylate (3)) was used as the crosslinking monomer (i.e., Embodiments 8-4 or 8-5), the weight ratio of the water extracts of the lens (less than 1.2%) and the weight ratio of the isopropanol extracts of the lens (less than 2.2%) were very low, indicating that the silicone hydrogel composition was completely cured.

Comparison of Contact Lenses of Present Disclosure and Commercially Available Contact Lenses After the curing of the silicone hydrogel compositions of Embodiments 5-3, 5-4, 6-2, and 7-2 were completed, the lenses were taken out from the polypropylene molds, and the lenses were extracted using water. Thereafter, the lenses were immersed in propylene blister filled with borate buffered saline or a phosphate buffered saline having pH value of 7.3 to 7.4, and then autoclaved at 121° C. for 30 minutes to prepare contact lenses.

To illustrate advantages of the contact lenses of the present disclosure, four commercially available contact lenses were purchased for comparison. Specifically, the four commercially available contact lenses are Delefilcon (Dailies Total 1) sold by Alcon, Somofilcon sold by cooper Vision, Unifilcon sold by Marshal Intergroup and Miacare sold by Benq Materials. The contact lenses made from Embodiments 5-3, 5-4, 6-2 and 7-2 and the four commercially available contact lenses were extracted with methanol, and weight ratios of methanol extracts were observed to evaluate the advantages and disadvantages of each contact lens.

In particular, the method of extracting the contact lenses using methanol was that the contact lenses were taken from the blister packages and placed in stirred deionized water for 5 hours. Next, the water was removed and replaced with fresh deionized water and stirring was continued for 5 hours. Replacing fresh deionized water was performed for two times. Thereafter, the contact lenses were dried in an oven at 105° C. for 16 hours. The dried contact lenses were taken out and placed in a desiccator, and a first dry weight of each contact lens was measured after 30 minutes. Next, the contact lenses were immersed in methanol for 4 hours. Subsequently, the contact lenses were placed in an oven to dry in the same manner, and a second dry weight of each contact lens was measured. The weight ratio of the methanol extracts is the difference between the first dry weight and the second dry weight divided by the first dry weight. The weight ratios of the methanol extracts of the contact lenses of the present disclosure and the commercially available contact lenses are listed in Table 13 below. In addition, curing methods and extraction methods used in the preparation process of the contact lenses of the present disclosure and the commercially available contact lenses are also listed in Table 13 below.

TABLE 13

| contact lenses | Embodiment 5-3 | Embodiment 5-4 | Embodiment 6-2 | Embodiment 7-2 |
|---|---|---|---|---|
| curing method | photocuring | photocuring | photocuring | photocuring |
| extraction method | water extraction | water extraction | water extraction | water extraction |
| % methanol extracts | 2.61% | 0.58% | 1.72% | 0% |
| contact lenses | Delefilcon | Miacare | Unifilcon | Somofilcon |
| curing method | photocuring | photocuring | photocuring | thermal curing |
| extraction method | organic solvent extraction | organic solvent extraction | water extraction | water extraction |
| % methanol extracts | 0.90% | 1.70% | 10.50% | 4.70% |

As can be seen from Table 13, the commercially available Delefilcon and Miacare contact lenses were prepared using the photocuring process and the organic solvent extraction process. Therefore, the weight ratios of the methanol extracts of Delefilcon and Miacare contact lenses were low. However, it also means that the manufacturing costs of Delefilcon and Miacare contact lenses that required the organic solvent extraction process were very high.

On the other hand, the commercially available Unifilcon and Somofilcon contact lenses were prepared using the photocuring process and the thermal curing process, respectively, and water extraction processes. Since Unifilcon and Somofilcon contact lenses were only subjected to the water extraction processes, the weight ratios of the methanol extracts were very high (10.50% and 4.70%). That is, Unifilcon and Somofilcon contact lenses contain a large amount of unreacted and non-crosslinked siloxane compounds, which may adversely affect the wearers (e.g., reduced wettability and lipid deposition).

The contact lenses of Embodiments 5-3, 5-4, 6-2, and 7-2 were prepared only using the water extraction processes, but the weight ratios of the methanol extracts were extremely low (less than 2.7%). The weight ratio of the methanol extracts of the contact lens of Embodiment 7-2 was even 0%. It means that almost all of the siloxane compounds in the silicone hydrogel compositions of the present disclosure had been completely polymerized without residue, so that the weight ratios of the methanol extracts of the produced contact lenses were extremely low.

In summary, the present disclosure provides a silicone hydrogel composition that can be used to prepare a contact lens. Since almost all of the siloxane compound has been completely polymerized without residue after the silicone hydrogel composition of the present disclosure is cured, it is not necessary to use an organic solvent to wash the lens obtained by polymerization, thereby reducing the manufacturing cost of the contact lens.

While the disclosure has been disclosed above in the embodiments, other embodiments are possible. Therefore, the spirit and scope of the claims are not limited to the description contained in the embodiments herein.

It is apparent to those skilled in the art that various alterations and modifications can be made without departing from the spirit and scope of the disclosure, and the scope of the disclosure is defined by the scope of the appended claims.

What is claimed is:

1. A silicone hydrogel composition comprising:
   a first hydrophilic monomer having an acrylate group or an acrylamide group;
   a siloxane compound having an acrylate group or an acrylamide group;
   a first crosslinking monomer having a plurality of acrylate groups or acrylamide groups, wherein when at least one of the first hydrophilic monomer, the siloxane compound, and the first crosslinking monomer comprises a methacrylate group or a methacrylamide group, the methacrylate group or the methacrylamide group is in a range of less than or equal to 5 wt % based on a total weight of the silicone hydrogel composition;
   a second hydrophilic monomer having a non-conjugated vinyl group; and
   a second crosslinking monomer having a plurality of non-conjugated vinyl groups;
   wherein a sum of a weight of the second hydrophilic monomer and a weight of the second crosslinking monomer is 40 to 100 parts by weight, relative to 100 parts by weight of a sum of a weight of the first hydrophilic monomer, the weight of the siloxane compound, and the weight of the first crosslinking monomer.

2. The silicone hydrogel composition of claim 1, wherein energy required for polymerization of the second hydrophilic monomer and the second crosslinking monomer is higher than that of the first hydrophilic monomer, the siloxane compound, and the first crosslinking monomer.

3. The silicone hydrogel composition of claim 1, wherein the siloxane compound is in a range of 35 wt % to 60 wt % based on a total weight of the silicone hydrogel composition.

4. The silicone hydrogel composition of claim 1, wherein the siloxane compound has a structure of the following formula (1):

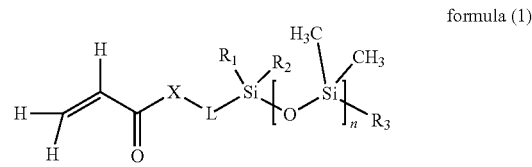

formula (1)

wherein X is O or NH;
L is $(CH_2)_m$, $(CH_2)_m$—$[O(CH_2)_p]_q$ or $(CH_2)_m(CHOH)$—$[O(CH_2)_p]_q$;
$R_1$ is OH, $CH_3$ or $OSi(CH_3)_3$,
$R_2$ is $CH_3$ or $OSi(CH_3)_3$,
$R_3$ is an alkyl group;
n is an integer from 1 to 30;
m and p are integers from 2 to 5; and
q is an integer from 1 to 5.

5. The silicone hydrogel composition of claim 1, wherein the siloxane compound is a siloxane monomer, a siloxane macromonomer or a siloxane prepolymer.

6. The silicone hydrogel composition of claim 1, wherein the siloxane compound has a number average molecular weight of less than 1200.

7. The silicone hydrogel composition of claim 1, wherein the siloxane compound comprises 3-tris(trimethyl siloxy) silylpropyl acrylamide, 3-tris(trimethyl siloxy) silylpropyl acrylate, 3-tris(triethyl siloxy) silylpropyl acrylamide, 3-tris (triethyl siloxy) silylpropyl acrylate, (3-acryloxy-2-hydroxy propoxy) propyl bis(trimethyl siloxy)methyl silane, (3-acryloxy-2-hydroxy propoxy) propyl bis(trimethyl siloxy) ethyl silane, (3-acrylamido-2-hydroxy propoxy) propyl bis(trimethyl siloxy)methyl silane, (3-acrylamido-2-hydroxy propoxy) propyl bis(trimethyl siloxy) ethyl silane, α-acrylamidopropyl-ω-butyl polydimethylsiloxane, α-acrylamidoethoxypropyl-ω-butyl polydimethylsiloxane, α-acryloxybutyl-ω-butyl polydimethylsiloxane, α-acryloxypropyl-ω-butyl polydimethylsiloxane, α-acryloxyethoxypropyl-ω-butyl polydimethylsiloxane, bis-α, ω-acrylamidopropyl polydimethylsiloxane, bis-α, ω-acrylamidoethoxypropyl polydimethylsiloxane, bis-α, ω-acryloxybutyl polydimethylsiloxane, bis-α,ω-acryloxypropyl polydimethylsiloxane, bis-α, ω-acryloxyethoxypropyl polydimethylsiloxane, or a combination thereof.

8. The silicone hydrogel composition of claim 1, wherein the first hydrophilic monomer is in a range of 10 wt % to 40 wt % based on a total weight of the silicone hydrogel composition.

9. The silicone hydrogel composition of claim 1, wherein the first hydrophilic monomer is selected from the group comprising 2-hydroxyethyl acrylamide, glycerol acrylate, acrylic acid, N,N-dimethylacrylamide, hydroxyethyl acrylamide, 2-acrylamido-2-methylpropanesulfonic acid, or a combination thereof.

10. The silicone hydrogel composition of claim 1, wherein the first crosslinking monomer is in a range of 0.1 wt % to 5 wt % based on a total weight of the silicone hydrogel composition.

11. The silicone hydrogel composition of claim 1, wherein the first crosslinking monomer is selected from the group comprising trimethylpropyl trimethacrylate, ethylene glycol diacrylate, diethylene glycol diacrylate, triethylene glycol diacrylate, trimethylolpropane triacrylate, pentaerythritol tetra acrylate, tetraethylene glycol diacrylate, ethylene diacrylamide, butylene 1,4-diacrylamide, or a combination of thereof.

12. The silicone hydrogel composition of claim 1, wherein the second hydrophilic monomer is in a range of 20 wt % to 50 wt % based on a total weight of the silicone hydrogel composition.

13. The silicone hydrogel composition of claim 1, wherein the second hydrophilic monomer is selected from the group comprising N-vinyl pyrrolidone, 1-vinylazonan-2-one, N-vinyl-N-methyl acetamide, vinyl sulfonic acid, glycine vinyl carbamate, glycine vinyl carbonate, or a combination thereof.

14. The silicone hydrogel composition of claim 1, wherein the second crosslinking monomer is in a range of 0.01 wt % to 1 wt % based on a total weight of the silicone hydrogel composition.

15. The silicone hydrogel composition of claim 1, wherein the second crosslinking monomer is 1,3,5-triallyl isocyanurate.

16. The silicone hydrogel composition of claim 1, further comprising a photoinitiator.

17. The silicone hydrogel composition of claim 16, wherein the photoinitiator is selected from the group comprising 1-hydroxycyclohexyl phenyl ketone, 2-benzyl-2-dimethylamino-1-(4-morpholinophenyl)-butanone-1,2,2-dimethoxy-1,2-diphenylethan-1-one, bis (η5,2,4-cyclo penta dien-1-yl)-bis(2,6-difluoro-3-(1H-pyrol-1-yl)-phenyl) titanium, 2,4,6-trimethyl benzoyl diphenyl phosphine oxide, phenyl bis(2,4,6-trimethyl benzoyl) phosphine oxide, bis-(2,6-dimethoxy benzoyl) (2,4,4-trimethylpentyl) phosphine oxide or a combination thereof.

18. A silicone hydrogel lens made from a silicone hydrogel composition of claim 1 using a photocuring reaction.

19. The silicone hydrogel lens of claim 18, wherein the silicone hydrogel lens is free of extraction using an organic solvent after the photocuring reaction.

* * * * *